US007998554B2

(12) United States Patent
Wang et al.

(10) Patent No.: US 7,998,554 B2
(45) Date of Patent: Aug. 16, 2011

(54) HYDROPHOBIC SURFACES WITH NANOPARTICLES

(75) Inventors: Xiaorong Wang, Hudson, OH (US); Hao Wang, Copley, OH (US)

(73) Assignee: Bridgestone Corporation, Tokyo (JP)

(*) Notice: Subject to any disclaimer, the term of this patent is extended or adjusted under 35 U.S.C. 154(b) by 221 days.

(21) Appl. No.: 10/886,283

(22) Filed: Jul. 6, 2004

(65) Prior Publication Data

US 2006/0008618 A1 Jan. 12, 2006

(51) Int. Cl.
*D06N 7/04* (2006.01)
*B32B 5/16* (2006.01)
*B32B 9/04* (2006.01)

(52) U.S. Cl. ........ 428/143; 428/323; 428/327; 428/331; 428/446; 428/141; 428/147; 428/149

(58) Field of Classification Search .................. 428/141, 428/143, 323, 327, 331, 445, 147, 149
See application file for complete search history.

(56) References Cited

U.S. PATENT DOCUMENTS 2,531,396 A 11/1950 Carter et al.
3,598,884 A 8/1971 Wei et al.
3,793,402 A 2/1974 Owens
3,840,620 A 10/1974 Gallagher
3,972,963 A 8/1976 Schwab et al.
4,075,186 A 2/1978 Ambrose et al.
4,233,409 A 11/1980 Bulkley
4,247,434 A 1/1981 Vanderhoff et al.
4,248,986 A 2/1981 Lal et al.
4,326,008 A 4/1982 Rembaum
4,386,125 A 5/1983 Shiraki et al.
4,463,129 A 7/1984 Shinada et al.
4,471,093 A 9/1984 Furukawa et al.
4,543,403 A 9/1985 Isayama et al.
4,598,105 A 7/1986 Weber et al.
4,602,052 A 7/1986 Weber et al.
4,659,790 A 4/1987 Shimozato et al.
4,717,655 A 1/1988 Fluwyler
4,725,522 A 2/1988 Breton et al.
4,764,572 A 8/1988 Bean, Jr.
4,773,521 A 9/1988 Chen
4,774,189 A 9/1988 Schwartz
4,788,254 A 11/1988 Kawakubo et al.
4,829,130 A 5/1989 Licchelli et al.
4,829,135 A 5/1989 Gunesin et al.
4,837,274 A 6/1989 Kawakubo et al.
4,837,401 A 6/1989 Hirose et al.
4,861,131 A 8/1989 Bois et al.
4,870,144 A 9/1989 Noda et al.
4,871,814 A 10/1989 Gunesin et al.
4,904,730 A 2/1990 Moore et al.
4,904,732 A 2/1990 Iwahara et al.
4,906,695 A 3/1990 Blizzard et al.
4,920,160 A 4/1990 Chip et al.
4,942,209 A 7/1990 Gunesin
5,036,138 A 7/1991 Stamhuis et al.
5,066,729 A 11/1991 Srayer, Jr. et al.
5,073,498 A 12/1991 Schwartz et al.
5,075,377 A 12/1991 Kawabuchi et al.
5,120,379 A 6/1992 Noda et al.
5,130,377 A 7/1992 Trepka et al.
5,169,914 A 12/1992 Kaszas et al.
5,194,300 A 3/1993 Cheung
5,219,945 A 6/1993 Dicker et al.
5,227,419 A 7/1993 Moczygemba et al.
5,237,015 A 8/1993 Urban
5,241,008 A 8/1993 Hall
5,247,021 A 9/1993 Fujisawa et al.
5,256,736 A 10/1993 Trepka et al.
5,262,502 A 11/1993 Fujisawa et al.
5,290,873 A 3/1994 Noda et al.
5,290,875 A 3/1994 Moczygemba et al.
5,290,878 A 3/1994 Yamamoto et al.
5,296,547 A 3/1994 Nestegard et al.
5,329,005 A 7/1994 Lawson et al.
5,331,035 A 7/1994 Hall
5,336,712 A 8/1994 Austgen, Jr. et al.
5,362,794 A 11/1994 Inui et al.
5,395,891 A 3/1995 Obrecht et al.
5,395,902 A 3/1995 Hall
5,399,628 A 3/1995 Moczygemba et al.
5,399,629 A 3/1995 Coolbaugh et al.
5,405,903 A 4/1995 Van Westrenen et al.
5,421,866 A 6/1995 Stark-Kasley et al.

(Continued)

FOREIGN PATENT DOCUMENTS

CA 2127919 3/1995
DE 3434983 4/1986
DE 4241538 6/1994
EP 143500 6/1985
EP 0255170 2/1988

(Continued)

OTHER PUBLICATIONS

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.
Formation of Worm-like Micelles from a Polystyrene-Polybutadiene-Polystyrene Block Copolymer in Ethyl Acetate, Canham et al., J.C.S. Faraday I, 1980, 76, 1857-1867.
Anomalous Behaviour of Solutions of Styrene-Butadiene Block Copolymers in Some Solvents, Tuzar et al., Makromol. Chem. 178, 22743-2746 (1977).
Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).

(Continued)

*Primary Examiner* — David R Sample
*Assistant Examiner* — Nancy Rosenberg
(74) *Attorney, Agent, or Firm* — Meredith E. Hooker; Nathan T. Lewis

(57) ABSTRACT

Hydrophobic surfaces with water contact angles greater than 120 degrees are created by the deposition of nano-particles. A process for the synthesis of suitable nano-particles is described as well as a process for the deposition of the particles.

19 Claims, No Drawings

U.S. PATENT DOCUMENTS 5,436,298 A 7/1995 Moczygemba et al.
5,438,103 A 8/1995 DePorter et al.
5,447,990 A 9/1995 Noda et al.
5,462,994 A 10/1995 Lo et al.
5,514,734 A 5/1996 Maxfield et al.
5,514,753 A 5/1996 Ozawa et al.
5,521,309 A 5/1996 Antkowiak et al.
5,525,639 A 6/1996 Keneko et al.
5,527,870 A 6/1996 Maeda et al.
5,530,052 A 6/1996 Takekoshi et al.
5,580,925 A 12/1996 Iwahara et al.
5,587,423 A 12/1996 Brandstetter et al.
5,594,072 A 1/1997 Handlin, Jr. et al.
5,614,579 A 3/1997 Roggeman et al.
5,627,252 A 5/1997 De La Croi Habimana
5,674,592 A * 10/1997 Clark et al. .................. 428/161
5,686,528 A 11/1997 Wills et al.
5,688,856 A 11/1997 Austgen, Jr. et al.
5,707,439 A 1/1998 Takekoshi et al.
5,728,791 A 3/1998 Tamai et al.
5,733,975 A 3/1998 Aoyama et al.
5,739,267 A 4/1998 Fujisawa et al.
5,742,118 A * 4/1998 Endo et al. .................... 313/479
5,747,152 A * 5/1998 Oka et al. ...................... 428/323
5,763,551 A 6/1998 Wunsch et al.
5,773,521 A 6/1998 Hoxmeier et al.
5,777,037 A 7/1998 Yamanaka et al.
5,811,501 A 9/1998 Chiba et al.
5,834,563 A 11/1998 Kimura et al.
5,847,054 A 12/1998 McKee et al.
5,849,847 A 12/1998 Quirk
5,855,972 A 1/1999 Kaeding
5,883,173 A 3/1999 Elspass et al.
5,891,947 A 4/1999 Hall et al.
5,905,116 A 5/1999 Wang et al.
5,910,530 A 6/1999 Wang et al.
5,955,537 A 9/1999 Steininger et al.
5,986,010 A 11/1999 Clites et al.
5,994,468 A 11/1999 Wang et al.
6,011,116 A 1/2000 Aoyama et al.
6,020,446 A 2/2000 Okamoto et al.
6,025,416 A 2/2000 Proebster et al.
6,025,445 A 2/2000 Chiba et al.
6,060,549 A 5/2000 Li et al.
6,060,559 A 5/2000 Feng et al.
6,087,016 A 7/2000 Feeney et al.
6,087,456 A 7/2000 Sakaguchi et al.
6,106,953 A 8/2000 Zimmermann et al.
6,117,932 A 9/2000 Hasegawa et al.
6,121,379 A 9/2000 Yamanaka et al.
6,127,488 A 10/2000 Obrecht et al.
6,147,151 A 11/2000 Fukumoto et al.
6,166,855 A * 12/2000 Ikeyama et al. ............... 359/580
6,180,693 B1 1/2001 Tang et al.
6,191,217 B1 2/2001 Wang et al.
6,197,849 B1 3/2001 Zilg et al.
6,204,354 B1 3/2001 Wang et al.
6,207,263 B1 * 3/2001 Takematsu et al. ........... 428/220
6,225,394 B1 5/2001 Lan et al.
6,252,014 B1 6/2001 Knauss
6,255,372 B1 7/2001 Lin et al.
6,268,451 B1 7/2001 Faust et al.
6,277,304 B1 8/2001 Wei et al.
6,348,546 B2 2/2002 Hiiro et al.
6,359,075 B1 3/2002 Wollum et al.
6,379,791 B1 4/2002 Cernohous et al.
6,383,500 B1 5/2002 Wooley et al.
6,395,829 B1 5/2002 Miyamoto et al.
6,420,486 B1 7/2002 DePorter et al.
6,437,050 B1 8/2002 Krom et al.
6,441,090 B1 8/2002 Demirors et al.
6,448,353 B1 9/2002 Nelson et al.
6,489,378 B1 12/2002 Sosa et al.
6,524,595 B1 2/2003 Perrier et al.
6,573,313 B2 6/2003 Li et al.
6,573,330 B1 6/2003 Fujikake et al.
6,598,645 B1 7/2003 Larson
6,649,702 B1 11/2003 Rapoport et al.
6,663,960 B1 12/2003 Murakami et al.
6,689,469 B2 2/2004 Wang et al.
6,693,746 B1 * 2/2004 Nakamura et al. ............ 359/580
6,706,813 B2 3/2004 Chiba et al.
6,706,823 B2 3/2004 Wang et al.
6,727,311 B2 4/2004 Ajbani et al.
6,737,486 B2 5/2004 Wang
6,750,297 B2 6/2004 Yeu et al.
6,759,464 B2 7/2004 Ajbani et al.
6,774,185 B2 8/2004 Lin et al.
6,777,500 B2 8/2004 Lean et al.
6,780,937 B2 8/2004 Castner
6,835,781 B2 12/2004 Kondou et al.
6,858,665 B2 2/2005 Larson
6,861,462 B2 3/2005 Parker et al.
6,872,785 B2 3/2005 Wang et al.
6,875,818 B2 4/2005 Wang
6,908,958 B2 6/2005 Maruyama et al.
6,956,084 B2 10/2005 Wang et al.
7,056,840 B2 6/2006 Miller et al.
7,071,246 B2 7/2006 Xie et al.
7,112,369 B2 9/2006 Wang et al.
7,179,864 B2 2/2007 Wang
7,193,004 B2 3/2007 Weydert et al.
7,205,370 B2 4/2007 Wang et al.
7,217,775 B2 5/2007 Castner
7,238,751 B2 7/2007 Wang et al.
7,244,783 B2 7/2007 Lean et al.
7,291,394 B2 11/2007 Winkler et al.
7,347,237 B2 3/2008 Xie et al.
7,408,005 B2 8/2008 Zheng et al.
7,538,159 B2 5/2009 Wang et al.
7,544,740 B2 6/2009 Wang et al.
7,553,909 B2 6/2009 Wang et al.
7,560,510 B2 7/2009 Bohm et al.
7,597,955 B2 10/2009 Wang et al.
7,649,049 B2 1/2010 Kleckner et al.
7,659,342 B2 2/2010 Wang et al.
7,718,737 B2 5/2010 Wang et al.
7,786,236 B2 8/2010 Wang et al.
7,795,344 B2 9/2010 Wang et al.
7,829,624 B2 11/2010 Warren
2001/0053813 A1 12/2001 Konno et al.
2002/0007011 A1 1/2002 Konno et al.
2002/0045714 A1 4/2002 Tomalia et al.
2002/0095008 A1 7/2002 Heimrich et al.
2002/0144401 A1 10/2002 Nogueroles Vines et al.
2003/0004250 A1 1/2003 Ajbani et al.
2003/0032710 A1 2/2003 Larson
2003/0124353 A1 7/2003 Wang et al.
2003/0130401 A1 7/2003 Lin et al.
2003/0149185 A1 8/2003 Wang et al.
2003/0198810 A1 10/2003 Wang et al.
2003/0225190 A1 12/2003 Borbely et al.
2004/0033345 A1 2/2004 Dubertret et al.
2004/0059057 A1 3/2004 Swisher et al.
2004/0067339 A1 * 4/2004 Gandon et al. ................ 428/141
2004/0091546 A1 5/2004 Johnson et al.
2004/0127603 A1 7/2004 Lean et al.
2004/0143064 A1 7/2004 Wang
2004/0198917 A1 10/2004 Castner
2005/0101743 A1 5/2005 Stacy et al.
2005/0182158 A1 8/2005 Ziser et al.
2005/0192408 A1 9/2005 Lin et al.
2005/0197462 A1 9/2005 Wang et al.
2005/0203248 A1 9/2005 Zheng et al.
2005/0215693 A1 9/2005 Wang et al.
2005/0228072 A1 10/2005 Winkler et al.
2005/0228074 A1 10/2005 Wang et al.
2005/0282956 A1 12/2005 Bohm et al.
2006/0084722 A1 4/2006 Lin et al.
2006/0173115 A1 8/2006 Wang et al.
2006/0173130 A1 8/2006 Wang et al.
2006/0235128 A1 10/2006 Bohm et al.
2007/0027264 A1 2/2007 Wang et al.
2007/0135579 A1 6/2007 Obrecht et al.
2007/0142550 A1 6/2007 Wang et al.
2007/0142559 A1 6/2007 Wang et al.
2007/0149649 A1 6/2007 Wang et al.

| | | | |
|---|---|---|---|
| 2007/0161754 | A1 | 7/2007 | Bohm et al. |
| 2007/0185273 | A1 | 8/2007 | Hall et al. |
| 2007/0196653 | A1 | 8/2007 | Hall et al. |
| 2008/0145660 | A1 | 6/2008 | Wang et al. |
| 2008/0149238 | A1 | 6/2008 | Kleckner et al. |
| 2008/0160305 | A1 | 7/2008 | Wang et al. |
| 2008/0286374 | A1 | 11/2008 | Wang et al. |
| 2008/0305336 | A1 | 12/2008 | Wang et al. |
| 2009/0005491 | A1 | 1/2009 | Warren et al. |
| 2009/0048390 | A1 | 2/2009 | Wang et al. |
| 2009/0054554 | A1 | 2/2009 | Wang et al. |
| 2009/0270558 | A1 | 10/2009 | Gandon-pain et al. |
| 2010/0004398 | A1 | 1/2010 | Wang et al. |
| 2010/0016472 | A1 | 1/2010 | Wang et al. |
| 2010/0016512 | A1 | 1/2010 | Wang et al. |

FOREIGN PATENT DOCUMENTS

| | | | | |
|---|---|---|---|---|
| EP | 0 265 142 | A2 | | 4/1988 |
| EP | 265142 | | | 4/1988 |
| EP | 0322905 | | | 7/1989 |
| EP | 0352042 | | | 1/1990 |
| EP | 0472344 | | | 2/1992 |
| EP | 0540942 | | | 5/1993 |
| EP | 0 590 491 | A2 | | 4/1994 |
| EP | 0742268 | | | 11/1996 |
| EP | 1031605 | | | 8/2000 |
| EP | 1 099 728 | A1 | | 5/2001 |
| EP | 1 134 251 | A1 | | 9/2001 |
| EP | 1273616 | | | 6/2002 |
| EP | 1321489 | | | 6/2003 |
| EP | 1783168 | | | 5/2007 |
| FR | 2099645 | | | 3/1972 |
| JP | 01279943 | | | 1/1989 |
| JP | 2191619 | | | 7/1990 |
| JP | 2196893 | | | 8/1990 |
| JP | 05132605 | | | 5/1993 |
| JP | 06248017 | | | 9/1994 |
| JP | 7011043 | | | 1/1995 |
| JP | 08-199062 | | | 8/1996 |
| JP | 2000-514791 | | | 11/2000 |
| JP | 2003-095640 | | | 4/2003 |
| JP | 2006-072283 | | | 3/2006 |
| JP | 2006-106596 | | | 4/2006 |
| JP | 2007-304409 | | | 11/2007 |
| WO | WO 91/04992 | | | 4/1991 |
| WO | 97/04029 | | | 2/1997 |
| WO | 98/53000 | | | 11/1998 |
| WO | WO 01/87999 | A2 | | 11/2000 |
| WO | 00/75226 | | | 12/2000 |
| WO | WO 02/02472 | | * | 1/2002 |
| WO | WO 02/31002 | A1 | | 4/2002 |
| WO | 0241987 | | | 5/2002 |
| WO | WO 02/081233 | | | 10/2002 |
| WO | WO 02/100936 | | | 12/2002 |
| WO | 03/032061 | | * | 4/2003 |
| WO | WO 03/085040 | | | 10/2003 |
| WO | WO2004/058874 | | | 7/2004 |
| WO | 2006/069793 | | | 7/2006 |
| WO | 2008/079276 | | | 7/2008 |
| WO | 2008/079807 | | | 7/2008 |
| WO | 2009/006434 | | | 1/2009 |

OTHER PUBLICATIONS

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Willey & Sons, Inc.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Functionalized Core Shell Polymers Prepared by Microemulsion Polymerization,E. Mendizabal, J.E. Pugh, A. Aguiar, S. Gonzalez-Villegas, 477/Antec '97/1733-1737.

An artide entitled Ultrahydrophobic and Ultralyophobic Surfaces: Some Comments and Examples, Wei Chen, et al., The ACS Journal of Surfaces and Colloids, May 11, 1999, vol. 15, No. 10. pp. 3395-3399, Polymer Science and Engineering Dept., Univ. of MA, Amherst, MA 01003.

An article entitled "Super-Repellent Composite Fluoropolymer Surfaces", S. R. Coulson, I. Woodward, J.P. S. Badyal, The Journal of Physical Chemistry B, vol. 104, No. 37, Sep. 21, 2000, pp. 8836-8840, Department of Chemistry, Science Laboratories, Durham University, Durham, DH1 3LE, England, U.K.

An article entitled "Transformation of a Simple Plastic into a Superhydrophobic Surface," H. Yildirim Erbil, et al., Science, vol. 299, Feb. 28, 2003, pp. 1377-1380.

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers—Their microdomain formation (in solid state) and surfactant behaviour (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).
Braun, Hartmut et al., "Enthalpic interaction of diblock copolymers with immiscible polymer blend components", Polymer Bulletin, vol. 32, pp. 241-248 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Calderara, Frederic et al., "Synthesis of chromophore-labelled polystyrene/poly(ethylene oxide) diblock copolymers", Makromol. Chem., 194, pp. 1411-1420 (1993).
Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Coleman, Lester E. et al., "Reaction of Primary Aliphatic Amines with Maleic Anhydride", J. Org,. Chem., 24, 185, pp. 135-136 (1959).
Cui, Honggang et al., "Block Copolymer Assembly via Kinetic Control", Science, vol. 317, pp. 647-650 (Aug. 3, 2007).
Dieterich, W. et al., "Non-Debye Relaxations in Disordered Ionic Solids", Chem. Chys., 284, pp. 439-467 (2002).
Edmonds, William F. et al., "Disk Micelles from Nonionic Coil-Coil Diblock Copolymers", Macromolecules, vol. 39, pp. 4526-4530 (May 28, 2006).
Ege, Seyhan, Organic Chemistry Structure and Reactivity, 3rd Edition, p. 959 (1994).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).
Erhardt, Rainer et al., Macromolecules, vol. 34, No. 4, pp. 1069-1075 (2001).
Eschwey, Helmut et al., "Preparation and Some Properties of Star-Shaped Polymers with more than Hundred Side Chains", Die Makromolekulare Chemie 173, pp. 235-239 (1973).
Eschwey, Helmut et al., "Star polymers from styrene and divinylbenzene", Polymer, vol. 16, pp. 180-184 (Mar. 1975).
Fendler, Janos H., "Nanoparticles and Nanostructured Films: Preparation, Characterization and Applications", Wiley-VCH, pp. 1-468 (1998).
Ferreira, Paula G. et al., "Scaling Law for Entropic Effects at Interfaces between Grafted Layers and Polymer Melts", Macromolecules, vol. 31, pp. 3994-4003 (1998).
Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).
Gay, C., "Wetting of a Polymer Brush by a Chemically Identical Polymer Melt", Macromolecules, vol. 30, pp. 5939-5943 (1997).
Gilman, J.W. et al., "Recent Advances in Flame Retardant Polymer Nanocomposites", pp. 273-283.
Giannelis, E.P. "Polymer Layered Silicate Nanocomposites", Advanced Materials, vol. 8, No. 1, pp. 29-35 (Jan. 1, 1996).
Guo, Andrew et al., "Star Polymers and Nanospheres from Cross-Linkable Diblock Copolymers", Macromolecules, vol. 29, pp. 2487-2493, Jan. 17, 1996.
Halperin, A., "Polymeric Micelles: A Star Model", Macromolecules, vol. 20, pp. 2943-2946 (1987).
Hamley, Ian W., "The Physics of Block Copolymers", Oxford Science Publication: Oxford, Chapters 3 and 4, pp. 131-265, (1998).
Hardacre, C. et al., "Structure of molten 1,3-dimethylimidazolium chloride using neutron diffraction", J. Chem. Physics, 118(1), pp. 273-278 (2003).
Hasegawa, Ryuichi et al., "Optimum Graft Density for Dispersing Particles in Polymer Melts", Macromolecules, vol. 29, pp. 6656-6662 (1996).
Haeussler, L. et al., "Simultaneous TA and MS Analysis of Alternating Styrene-Malei Anhydride and Styrene-Maleimide Copolymers", Thermochim. Acta, 277, 14 (1996).
Hay, J.N. et al., "A Review of Nanocomposites" (2000).
Ishizu, Koji et al., "Synthesis of Star Polymer with Nucleus of Microgel", Polymer Journal, vol. 12, No. 6, pp. 399-404 (1980).
Ishizu, Koji et al., "Core-Shell Type Polymer Microspheres Prepared from Block Copolymers", Journal of Polymer Science: Part C: Polymer Letters, vol. 26, pp. 281-286 (1988).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
Ishizu, Koji, "Synthesis and Structural Ordering of Core-Shell Polymer Microspheres", Prog. Polym. Sci., vol. 23, pp. 1383-1408 (1998).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Jensen, M. et al., "EXAFS Investigations of the Mechanism of Facilitated Ion Transfer into a Room-Temperature Ionic Liquid", Jacs, 124, pp. 10664-10665 (2002).
Kim, Woo-Sik et al., "Synthesis and Photocrosslinking of Maleimide-Type Polymers", Macromol. Rapid Commun., 17, 835, pp. 835-841 (1996).
Kralik, M. et al., "Catalysis by metal nanoparticles supported on functional organic polymers", Journal of Molecular Catalysis A: Chemical, vol. 177, pp. 113-138 (2001).
Kraus, Gerard, "Mechanical Losses in Carbon-Black-Filled Rubbers", Journal of Applied Polymer Science: Applied Polymer Symposium, vol. 39, pp. 75-92 (1984).
Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).
Ligoure, Christian, "Adhesion between a Polymer Brush and an Elastomer: A Self-Consistent Mean Field Model", Macromolecules, vol. 29, pp. 5459-5468 (1996).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).
Ma, Qinggao et al., "Entirely Hydrophilic Shell Cross-Linked Knedel-Like (SCK) Nanoparticles", Polymer Preprints, vol. 41, No. 2, pp. 1571-1572 (2000).
Matsen, M.W., "Phase Behavior of Block Copolymer/Homopolymer Blends", Macromolecules, vol. 28, pp. 5765-5773 (1995).
Matsumoto, A. et al., "Synthesis, Thermal Properties and Gas Permeability of Poly (N-n-alkylmaleimide)s", Polymer Journal, vol. 23, No. 3, pp. 201-209 (1991).
Mayer, A.B.R. et al., "Transition metal nanoparticles protected by amphiphilic block copolymers as tailored catalyst systems", Colloid Polym. Sci., 275, pp. 333-340 (1997).
Mi, Yongli et al., "Glass transition of nano-sized single chain globules", Polymer 43, Elsevier Science Ltd., pp. 6701-6705 (2002).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).

Nace, Vaughn M., "Nonionic Surfactants: Polyoxyalkylene Block Copolymers",.Surfactant Science Series, vol. 60, pp. 1-266 (1996).
Newkome G.R, "Dendrimers and Dendrons, Concept, Synthesis, Application", pp. 45, 191-310 (2001).
Noolandi, Jaan et al., "Theory of Block Copolymer Micelles in Solution", Macromolecules, vol. 16, pp. 1443-1448 (1983).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Oranli, Levent et al., "Hydrodynamic studies on micellar solutions of styrene-butadiene block copolymers in selective solvents", Can. J. Chem., vol. 63, pp. 2691-2696, 1985.
Piirma, Irja, "Polymeric Surfactants", Surfactant Science Series, vol. 42, pp. 1-289 (1992).
Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.
Price, Colin, "Colloidal Properties of Block Copolymers", Applied Science Publishers Ltd., Chapter 2, pp. 39-80 (1982).
Rager, Timo et al., "Micelle formation of poly(acrylic acid)-block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Riess, Gerard et al., "Block Copolymers", Encyclopedia of Polymer Science and Engineering, vol. 2, pp. 324-434 (1985).
Riess, Gerard, "Micellization of block copolymers", Prog. Polym. Sci., vol. 28, pp. 1107-1170 (Jan. 16, 2003).
Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Saito, Reiko et al., "Arm-number effect of core-shell type polymer microsphere: 1. Control of arm-number of microsphere", Polymer, vol. 35, No. 4, pp. 866-871 (1994).
Saito, Reiko et al., "Synthesis of Microspheres with Microphase-Separated Shells", Journal of Polymer Science: Part A: Polymer Chemistry, vol. 38, pp. 2091-2097 (2000).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Shull, Kenneth R., "End-Adsorbed Polymer Brushes in High- and Low-Molecular-Weight Matrices", Macromolecules, vol. 29, pp. 2659-2666 (1996).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tiyapiboonchaiya, C. et la., "Polymer-m-Ionic-Liquid Electrolytes", Micromol. Chem. Phys., 203, pp. 1906-1911 (2002).
Tsitsilianis, Constantinos et al., Makromol. Chem. 191, pp. 2319-2328 (1990).
Tuzar, Zdenek et al., "Micelles of Block and Graft Copolymers in Solutions", Surface and Colloid Science, vol. 15, Chapter 1, pp. 1-83 (1993).
Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392—Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Synthesis, Characterization, and Application of Novel Polymeric Nanoparticles", Macromolecules, 40, pp. 499-508 (2007).
Wang, Xiaorong et al., "Heterogeneity of structural relaxation in a particle-suspension system", EPL, 79, 18001, pp. 1-5 (Jul. 2007).
Webber, Stephen E. et al., "Solvents and Self-Organization of Polymers", NATO ASI Series, Series E: Applied Sciences, vol. 327, pp. 1-509 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).
Wilson, D.J. et al., "Photochemical Stabilization of Block Copolymer Micelles", Eur. Polym. J., vol. 24, No. 7, pp. 617-621, 1988.
Witten, T.A. et al., "Stress Relaxation in the Lamellar Copolymer Mesophase", Macromolecules, vol. 23, pp. 824-829 (1990).
Wooley, Karen L, "From Dendrimers to Knedel-like Structures", Chem. Eur. J., 3, No. 9, pp. 1397-1399 (1997).
Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Worsfold, D.J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
Vulcanization Agents and Auxiliary Materials, Kirk-Othmer, Encyclopedia of Chemical Technology, 3rd Ed., Wiley Interscience, NY, 1982, vol. 22, pp. 390-403.
Johnson, Edward M., International Search Report dated Dec. 12, 2008 from PCT Application No. PCT/US07/74611 (5 pp.).
Wang, Xiaorong et al., U.S. Appl. No. 12/374,883, filed Jul. 27, 2007, entitled "Polymeric Core-Shell Nanoparticles with Interphase Region".
Sakurai, Ryo et al., "68.2: Color and Flexible Electronic Paper Display using QR-LPD Technology", SID 06 Digest, pp. 1922-1925 (2006).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 International Search Report from PCT Patent Application No. PCT/US2004/001000 filed Jan. 15, 2004 (3 pp.).
Russell, G., Aug. 1, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/026031 filed Dec. 19, 2007 (3 pp.).
Mullis, Jeffrey C., Mar. 11, 2009 Office Action from U.S. Appl. No. 10/791,049 [9 pp.].
Harlan, Robert D., Mar. 11, 2009 Notice of Allowance from U.S. Appl. No. 10/791,177 [8 pp.].
Sykes, Altrev C., Mar. 20, 2009 Office Action from U.S. Appl. No. 11/818,023 [27 pp.].
Pak, Hannah J., Apr. 2, 2009 Office Action from U.S. Appl. No. 11/941,128 [9 pp.].
Harlan, Robert D. Apr. 30, 2009 Office Action from U.S. Appl. No. 11/117,981 [7 pp.].
Mullis, Jeffrey C., Apr. 30, 2009 Final Office Action from U.S. Appl. No. 11/641,514 [11 pp.].
Mulcahy, Peter D., May 13, 2009 Office Action from U.S. Appl. No. 11/642,802 [7 pp.].
Peets, Monique R., May 11, 2009 Restriction/Election Office Action from U.S. Appl. No. 11/697,801 [6 pp.].
Mullis, Jeffrey C., May 19, 2009 Advisory Action from U.S. Appl. No. 10/791,049 [5 pp.].
Zemel, Irina Sopja, Office Action dated May 28, 2009 from U.S. Appl. No. 11/305,279 [7 pp.].
Mullis, Jeffrey C., Jul. 15, 2009 Advisory Action from U.S. Appl. No. 11/641,514 [4 pp.].
Peets, Monique R., Jul. 20, 2009 Office Action from U.S. Appl. No. 11/697,801 [9 pp.].
Sykes, Altrev C., Oct. 16, 2009 Office Action from U.S. Appl. No. 11/818,023 [20 pp.].
Mullis, Jeffrey C., Nov. 9, 2009 Office Action from U.S. Appl. No. 11/641,514 [9 pp.].
Mulcahy, Peter D., Nov. 9, 2009 Final Office Action from U.S. Appl. No. 11/642,802 [6 pp.].
Kiliman, Leszek B., Nov. 13, 2009 Office Action from U.S. Appl. No. 10/817,995 [6 pp.].
Zemel, Irina Sopja, Dec. 3, 2009 Final Office Action from U.S. Appl. No. 11/305,279 [10 pp.].
Harlan, Robert D., Dec. 4, 2009 Notice of Allowance from U.S. Appl. No. 11/117,981 [5 pp.].
Mullis, Jeffrey C., Dec. 18, 2009 Supplemental Notice of Allowability from U.S. Appl. No. 11/050,115 [2 pp.].
Harlan, Robert D., Dec. 29, 2009 Notice of Allowance from U.S. Appl. No. 10/791,177 [6 pp.].
Peets, Monique R., Jan. 5, 2010 Final Office Action from U.S. Appl. No. 11/697,801 [9 pp.].
Pak, Hannah J., Jan. 6, 2010 Final Office Action from U.S. Appl. No. 11/941,128 [10 pp.].
Harlan, Robert D., Dec. 28, 2009 Office Action from U.S. Appl. No. 12/504,255 [6 pp.].
Wheeler, Thurman Michael, Feb. 8, 2010 Office Action from U.S. Appl. No. 11/642,796 [13 pp.].
Mullis, Jeffrey C., May 26, 2010 Final Office Action from U.S. Appl. No. 11/641,514 [8 pp.].
Ducheneaux, Frank D., Jun. 8, 2010 Office Action from U.S. Appl. No. 10/817,995 [19 pp.].
Harlan, Robert D., Jun. 9, 2010 Office Action from U.S. Appl. No. 12/504,255 [6 pp.].
Wheeler, Thurman Michael, Jul. 30, 2010 Final Office Action from U.S. Appl. No. 11/642,796 [15 pp.].
Mullis, Jeffrey C., Aug. 12, 2010 Advisory Action from U.S. Appl. No. 11/641,514 [4 pp.].
Mensah, Laure, Sep. 20, 2010 Office Action from European Patent Application No. 07813483.0 [4 pp.].
Egwim, Kelechi Chidi, Sep. 30, 2010 Office Action from U.S. Appl. No. 12/047,896 [6 pp.].
Mullis, Jeffrey C., Oct. 8, 2010 Notice of Allowance from U.S. Appl. No. 11/641,514 [2 pp.].
Wang, Xiaorong et al., "Dispersing hairy nanoparticles in polymer melts", Polmer, vol. 49, pp. 5683-5691.

* cited by examiner

HYDROPHOBIC SURFACES WITH NANOPARTICLES

BACKGROUND OF THE INVENTION

1. Field of the Invention

One aspect of the invention relates to hydrophobic surfaces and the creation of hydrophobic surfaces via the build-up of a nanoparticle surface layer on a substrate. Another aspect of the invention relates to the synthesis and/or modification of nanoparticles.

2. Background of the Invention

Surfaces that are water repellent have a wide variety of uses. Examples include antennas, submarine hulls, metal refining, and stain-resistant textiles. Accordingly, the art has seen various attempts to create water repellent surfaces, for instance via chemical modification of the surfaces with fluorine compounds. However, the fluorination process is usually expensive, cumbersome, environmentally unfriendly, and/or poses health concerns. Furthermore, attempts to improve hydrophobicity of a solid surface via control of its geometrical roughness often involve photolithography and/or plasma deposition and have generally been found very expensive in practice.

Attempts to create water repellent surfaces are mentioned in, e.g., Coulson et al., J. Phys. Chem. B. 104, p. 8836 et seq. (2000); Chen et al., Langmuir 15, p. 3395 et seq. (1999); and Erbil et al., Science 299, p. 1377 et seq. (2003).

Nanoparticles are discussed in, e.g., U.S. Pat. No. 6,437,050, which is hereby incorporated in its entirety by reference.

SUMMARY OF THE INVENTION

In one embodiment, the present invention provides substrates comprising a nanoparticle surface layer having a water contact angle that exceeds 120 degrees.

In one embodiment, the present invention provides nanoparticles suitable for creating a hydrophobic surface.

An advantage of the present invention includes making nanoparticles and creating a good water repellent surface via a comparatively simple method.

Additional advantages and features of the present invention are set forth in this specification, and in part will become apparent to those skilled in the art on examination of the following, or may be learned by practice of the invention. The inventions disclosed in this application are not limited to any particular set of or combination of advantages and features. It is contemplated that various combinations of the stated objects, advantages and features make up the inventions disclosed in this application.

DETAILED DESCRIPTION OF THE INVENTION

The present invention provides a process for making hydrophobic surfaces as well as surfaces created by such processes. In one embodiment, the present invention provides a process comprising depositing nanoparticles on a first surface of a substrate to form a nanoparticle surface layer on said substrate.

The substrate may vary and can be, for instance, an inorganic substrate (e.g. a glass substrate (A.K.A. a glazing); a ceramic substrate; or a metal substrate) or an organic substrate (e.g. a wood substrate; a polymeric substrate; or a textile) and may form part of a variety of articles, e.g. antennas, submarine hulls, metal refinings, textiles (e.g. stain resistant textiles), windows, etc. In one particular embodiment, the substrate comprises a material that is transparent. Transparent is used herein to mean a material that has a clarity that is greater than translucent, meaning that the substrate will transmit a sufficient amount of light to not inhibit a viewer's perception of a distinct image as the viewer looks through the substrate at the image. More preferably, transparent means that the substrate transmits enough light that an image may be seen through the substrate as if the substrate was not there.

The "first surface" may be, for instance, a bare surface of the substrate or a coating on the substrate. In one embodiment, the first surface is tacky upon said depositing. In one embodiment, the first surface is at least partly molten when the nanoparticles are deposited. In one embodiment, the first surface is formed via coating a surface of the substrate with a curable composition (e.g. a composition comprising epoxy compounds and/or ethylenically unsaturated monomers such as, e.g., acrylates or methacrylates). In one embodiment, the curable composition is at least partly cured prior to the depositing of the nanoparticles. In one embodiment, the curable composition (or at least partly cured curable composition) is post-cured after the depositing. In one embodiment, the first surface is a material selected from the group consisting of polyesters, polyethers, polyurethanes, silicones, and epoxies. In a further embodiment, the first surface comprises an adhesive that is suitable to adhere the nanoparticles to the substrate.

The methods of depositing the nanoparticles on the first surface may vary and may include, for instance, spraying the particles on the first surface or coating the surface with a composition comprising the nanoparticles (followed by removal of non-nanoparticle components in the composition such as solvents). Other methods that may be used include, for instance, dipping, painting, or brushing. Fixing the nanoparticles on the first surface can be effected via various methods. In one embodiment, if the first surface is in the molten state, the fixing can be effected via cooling. In another embodiment, if the first surface is a curable composition (or at least partly cured curable composition), the fixing may be effected via curing the composition after the nanoparticle deposition ("post-curing"). In another embodiment, the nanoparticles may be fixed on the surface via pressure (i.e. pressing the nanoparticles onto the first surface).

In another example of depositing, the nanoparticles are precipitated from a solution onto a substrate. In this embodiment, the nanoparticles are suspended in a solution and the substrate is located in the solution adjacent a bottom surface of a vessel that contains the solution. An agglomeration modifier may be added to the solution. Preferably the nanoparticles will agglomerate to a desired size such that and the particles will fall from the solution onto the substrate. Preferably, the substrate containing the agglomerated particles is removed from the vessel. In one example the nanoparticles may comprise organic polymers and the solution may comprise a hydrocarbon, e.g., hexane, toluene, pentane, and combinations thereof. In this case a suitable modifier will comprise an alcohol such as, but not limited to, methanol, ethanol, propanol, butanol, isopropanol or mixtures thereof. The ratio of agglomeration modifier to solution may comprise about 1:99 to about 99:1. In preferred embodiment, the concentration of agglomeration modifier comprises less than about 50 pph, preferably less than about 30 pph, more preferably about 20 pph or less, and even more preferably about 10 pph or less.

An optional step that may be practiced as part of the above embodiment is to add a UV cure agent to the solution prior to adding agglomeration modifier. One example of a suitable UV cure agent comprises peroxide. Nanoparticles which have been exposed to a UV cure agent may be cured to a substrate upon exposing the agglomerated particles which have been deposited onto substrate to actinic energy, such as UV light.

In a further embodiment of depositing, the nanoparticles are deposited by compression. In one example of this embodiment, the nanoparticles are prepared in the same manner as described above regarding precipitating except instead of the particle precipitating onto a substrate, the agglomerated particles are filtered and dried. The particles are dried to an extent that they are in powder form. In adhesive may be applied to a first surface of the substrate. An example of a suitable adhesive comprises an epoxy. The particles are applied to the adhesive coated first surface of the substrate. A compressive force is applied to the particles to adhere the particles to the first surface. Optionally this embodiment may include the step of removing particles which did not adhere to the substrate. One example of the removing of particles may comprise passing a current of air across the particles applied to the first surface. Preferably the air current is moving past the substrate at sufficient velocity to remove the particles which are not adhered to the first surface away from the substrate without removing previously adhered particles.

In a further embodiment, the process is substantially free of a plasma deposition step, a photolithography step, or both.

In one embodiment, the nanoparticle surface layer formed via deposition of the nanoparticles on the first surface of the substrate has a water contact angle of at least 120 degrees, e.g. at least 130 degrees, at least 140 degrees, at least 150 degrees, at least 160 degrees, or at least 170 degrees. In one embodiment, the water contact angle is below 180 degrees, e.g. below 175 degrees.

In another embodiment of the invention, preferably, the nanoparticle surface layer comprises a roughness resolution of less than micro-scale. A roughness resolution of less than micro-scale is herein used to describe a surface having two or more adjacent nanoparticles which the distance between the two particles comprises less than 1 micron. The distance between adjacent particles can be measured by Atomic Force Microscopy ("AFM"). In a further embodiment, the two ratio radii of the two adjacent particle may comprise about 10 to about 1 or higher and more preferably between about 10 to about 1 to about 1000 to about 1.

The nanoparticles may be organic (e.g. polymeric) or inorganic (e.g. metal oxide particles such as silica particles), or combinations thereof (e.g. polymer coated inorganic particles, e.g. polymer coated metal particles, etc.). Preferably the nanoparticles have an exterior hydrophobic surface. Preferably the water contact angle of the nanoparticle having the hydrophobic surface comprises at least about 50°, more preferably at least about 60°, and even more preferably at least about 70°. The nanoparticles may be surface modified. For instance, in one embodiment, the nanoparticles may be surface modified with silyl groups, e.g. trialkyl (for instance trimethyl) silyl groups. The exterior surface of the nanoparticles deposited may be comprised of the same material or a composite of different materials. Also, the exterior surface of the two nanoparticles deposited on the substrate may be composed of different materials. For example the exterior surface of a first nanoparticle may be comprised of a conjugated diene and the exterior surface of a second nanoparticle may be comprised of a metal oxide.

Polymeric nanoparticles may be prepared via, e.g., a process comprising polymerizing organic monomers, e.g. ethylenically unsaturated monomers, for instance alkenes and/or alkynes.

Examples of organic compounds that may be used as monomers in the polymerization reactions include substituted, unsubstituted, branched, unbranched, conjugated, unconjugated, and cyclic ethylenically unsaturated olefins. The olefins generally contain one or more ethylenically unsaturated groups, e.g. at least two or at least three ethylenically unsaturated groups. Examples include ethylene, propylene, isobutylene, diisobutylene, cis-2-butene, trans-2-pentene, cyclopentene, 1,4-cyclohexadiene, butadiene, cis-isoprene, trans-isoprene, 2-methyl-1-heptene, cyclooctatetrene (COT), acetylene, propyne, 3-hexyne, cycloheptyne, acetonitrile, and pentanenitrile. In one embodiment, the nanoparticles are prepared via polymerization of at least butadiene and/or isoprene. Certain arenes may also be used as monomers. Examples of suitable arenes include, e.g., styrene. It is also within the scope of the present invention to use mixtures of olefins, mixtures of olefins with non-olefins, and mixtures of olefins with arenes.

Preferably the nanoparticle has a mean average diameter of less than 1 micron, more preferably about less than 500 nm. In one embodiment, nano-sized polymer particles are prepared via polymerizing a plurality of monomers in a solvent (e.g. a hydrocarbon solvent) to form a block copolymer, and crosslinking the block copolymer with a crosslinking agent to form nano-sized particles having a mean average diameter of less than about 250 nm (e.g. less than about 100 nm). The nanoparticles of this embodiment may be either partially or fully crosslinked. In a further embodiment, the mean average diameter of the deposited nanoparticles may be substantially uniform or substantially random. The mean average diameter of the nanoparticles may be considered substantially uniform if the mean average diameter of a majority of the particles deposited comprises with 25% of each other. Likewise, the mean average diameter of the nanoparticles deposited may be substantially random if the mean average diameter of a majority of the nanoparticles deposited differs by more than the 25%.

The polymerization can be initiated by a number of chemical or physical initiators. Examples of chemical initiators include alkyl lithium (e.g. ethyl lithium, propyllithium, or butyllithium); aryl lithium (e.g. phenyllithium, tolyllithium); alkenyl lithium (e.g. vinyllithium, propenyllithium); and alkylene lithium (e.g. tetramethylene lithium, pentamethylene lithium). Examples of physical initiators include heat, visible light, UV radiation, and IR radiation. In one embodiment of the present invention, polymerization is initiated with butyllithium. In a preferred embodiment of the present invention, polymerization is initiated by using a butyllithium/hexane mixture. In one embodiment, the concentration of butyllithium in hexane ranges from about 0.5M to about 2.5M, e.g. 0.75M to about 1.75M, for instance about 1.5M. Any suitable amount of butyllithium/hexane mixture can be used. In one embodiment, an amount between about 1 ml and about 10 ml is used, e.g. from about 3 ml to about 8 ml, such as about 5 ml.

It is within the scope of this invention to employ at least one catalyst during the polymerization. Appropriate catalysts include those that modify the reaction rate (increase or decrease), modify the product ratios, and modify the reactivity of the reactants. A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 400 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 5% and 95%, and preferably less than about 35%.

In one embodiment of the present invention, the polymerization reaction is conducted in a reactor in a solvent at elevated temperatures and/or pressures. In another embodiment of the present invention, the polymerization reaction is conducted without a solvent. In another embodiment of the present invention, the polymerization reaction is conducted at room temperature and/or atmospheric pressure. In a further embodiment of the present invention, the polymerization reaction is conducted at temperatures and/or pressures lower than room temperature and/or atmospheric pressure.

In one embodiment of the present invention the polymerization reaction is conducted at a temperature of from about 75° F. to about 275° F. (about 23.9-135° C.), e.g. at a temperature of from about 100° F. to 200° F. (about 37.8-93.3° C.), such as at a temperature of about 100-150° F. (about 37.8-65.6° C.).

The conversion percentage of polymer product is preferable from about 75% to about 100%, more preferably from about 90% to about 100% and most preferably about 100%.

The polymer product has a number average molecular weight of preferably at least about 10,000, e.g. at least about 50,000, at least about 75,000, at least about 100,000, at least about 200,000, or at least about 500,000 g/mol. The polymer product generally has a number average molecular weight below about 100,000,000, e.g. below about 10,000,000, below about 5,000,000, below about 3,000,000 or below about 1,500,000 g/mol.

In one embodiment, the polydispersity of the molecular weight of the polymers ranges from about 1.00 to about 4.00, e.g. about 1.00-2.00, about 1.00-1.50, or about 1.00-1.25.

Further reactions of the particles produced after the polymerization reaction may include secondary polymerization, hydrogenation, halogenation, oxidation, and nitration. Secondary polymerization may be effected by adding one or more monomers during or after the first polymerization. These monomers may be similar or dissimilar to the monomers used in the first polymerization reaction. In one embodiment, vinyl-substituted hydrocarbon monomers such as, e.g., styrene are added. In one embodiment, a styrene/hexane blend is added after the first polymerization reaction. Also, crosslinking agents, e.g. divinylbenzene, may be added.

Hydrogenation of the polymer particles can occur, e.g., at high temperatures, high pressures, and/or in the presence of catalysts. Examples of catalysts include, e.g., catalysts such as Pt, Pd, Rh, Ru, Ni, and mixtures thereof. The catalysts may be, e.g., finely dispersed solids or absorbed on inert supports such as carbon, silica, or alumina. Preferred catalysts include nickel octoate, nickel ethylhexanoate, and mixtures thereof. The hydrogen atoms necessary for the reaction can come from hydrogen gas or any other hydrogen producing compounds. It is within the scope of the present invention to use any or a combination of these hydrogenating agents.

In one embodiment of the present invention, a nickel octoate catalyst is used along with hydrogen gas for the hydrogenation. The pressure of the hydrogen gas may vary and can be, for instance, in the range of about 25 psi to about 2000 psi (about 0.17-13.8 MPa), e.g. about 50 psi to about 500 psi (about 0.34-6.9 MPa), such as about 90 psi to about 120 psi (about 0.62-0.83 MPa).

In one embodiment, the temperature of the hydrogenation reaction is in the range of about 100° F. to 500° F. (about 37.8-260° C.), e.g. about 150° F. to 250° F. (about 65.6-121.1° C.), such as about 200° F. (about 93.3° C.).

In one embodiment, the level of hydrogenation (also referred to as hydrogenation conversion) is in the range of about 75% to about 100%, e.g. about 90% to about 100%, such as about 100%.

In one embodiment, the nano-sized polymer particles are prepared via (a) polymerizing, in a first solvent, at least one ethylenically unsaturated monomer to obtain a first polymer;
b) adding further ethylenically unsaturated monomer to said first polymer and said solvent;
(c) polymerizing said further ethylenically unsaturated monomer with said first polymer to obtain a second polymer;
(d) optionally, crosslinking said second polymer to obtain a crosslinked second polymer;
(e) optionally, hydrogenating said second polymer or said crosslinked second polymer; and
(f) precipitating said, optionally crosslinked and/or hydrogenated, second polymer in a non-solvent.

Another example of a synthesis process to form two or more nanoparticles comprises a three step process. The first step comprises the anionic solution polymerization of conjugated diene monomer units, such as but not limited to butadiene, to form a first polymer block. In the case of polymerizing butadiene monomer units, the polymer block comprises polybutadiene. A second step of the process comprises the adding a monomer comprising vinyl aromatic hydrocarbon units to the conjugated diene polymer, such as, but not limited to, styrene. The aromatic monomer units will polymerize and form a second polymer block of vinyl aromatic hydrocarbon units. The resulting first and second polymer blocks will form a conjugated diene-vinyl aromatic block copolymer. Alternatively, the two or more nanoparticles may have one or more properties that differ, such as, mean average diameter or material of construction of the exterior surface of the nanoparticle.

The third step of the process includes adding a micelle modifier to the solution. One example of a micelle modifier includes a linear hydrocarbon such as, but not limited to, hexane. Suitable micelle modifiers include materials in which the conjugated diene blocks of the copolymer are soluble and the vinyl aromatic block of the copolymer is not soluble. Preferably the vinyl aromatic block of the polymer still comprises at least one live end. Optionally the vinyl aromatic block of the copolymer containing the live end may be coupled to other vinyl aromatic groups with live ends. The coupling may occur by adding a coupling agent to the copolymer solution. Examples of suitable coupling agents include, but are not limited, divinylbenzene ("DVB"), acrylate compounds, (meth)acrylate compounds and combinations thereof.

In one embodiment, the first solvent includes a hydrocarbon solvent, e.g. hexane. In one embodiment, the at least one ethylenically unsaturated monomer includes butadiene and/or isoprene. In one embodiment, the further ethylenically unsaturated monomer includes styrene. In one embodiment, the crosslinking is effected with divinylbenzene as crosslinking agent. The solvent used for precipitation (the "non-solvent") may be, for instance, water, acetone, ethanol, isopropanol, acetonitrile, $CCl_4$, $CS_2$, benzene, hexanes, cyclohexanes, ethers, esters, and mixtures thereof. In one embodiment, the non-solvent includes isopropanol (e.g. an isopropanol/acetone mixture, e.g. a 5:95 isopropanol/acetone mixture). In one embodiment, the first polymer is a block copolymer. In one embodiment, the polydispersity of the first polymer is in the range of 1-5, e.g. 1-3, 1-2, 1-1.5, 1.3, or 1-1.15. In one embodiment, the precipitated second polymer (the nanoparticles) has a particle size dispersity in the range of 1-3, e.g. 1-2.5, 1-2, 1-1.5, or 1-1.3.

In one embodiment, the nanoparticles used in the present invention have a mean average particle size of about 5 nm to about 250 nm, e.g. about 5 nm to about 100 nm, such as 5-50 nm or 10-40 nm. In one embodiment, the nanoparticles have a mean average particle size of about 20 nm. Preferably, the present nanoparticles are solid.

In another embodiment of the invention, the substrate may comprise particles which are not nano-sized particles. In one certain embodiment, the substrate includes the aforementioned nanoparticles and particles which are larger than the aforementioned nanoparticles. In a further embodiment of the invention, the particles deposited on the substrate randomly or uniformly. In an additional embodiment, nanoparticles may be located in a particular section of the substrate such that the nanoparticles are concentrated in one or more areas of the substrate or alternatively, the nanoparticles may not be concentrated in any particular location on the substrate.

The following examples are given as particular embodiments of the invention and to demonstrate the practice and advantages thereof. The examples are given by way of illustration and are not intended to limit the specification or the claims that follow in any manner.

EXAMPLES

The Ni catalyst solution used in the Examples below was prepared according to the following procedure: A vessel (32 oz (0.95 ltr)) was purged with $N_2$ at 10 psi (0.069 MPa) and 200 ml/min for 2 hrs, after which nickel octoate (111 ml, 8 wt. % in hexane), hexane (37 ml), and cyclohexene (6 ml) were added to the vessel. The vessel was cooled by placing it in a dry ice bath, and tributyl aluminum (266.4 ml, 0.68 M in hexane) was slowly added into the vessel while keeping cool, resulting in the Ni catalyst solution.

The water contact angles in the below experiments were determined along the lines of ASTM D5946, which method is hereby incorporated in its entirety by reference: A thin tip pipette was used to deposit a water drop (diameter about 1-2 mm) on the surface of which the water contact angle was to be determined (hereinafter "water contact surface"). An OLYMPUS digital camera was used to capture the image of the water drop sitting on the surface (the camera lens was positioned at the same horizontal level as the water contact surface when the image was captured). The thus obtained image of the water drop on the water contact surface was then enlarged using a computer and the water contact angle was measured from the enlarged image.

Example 1

A polymerization reactor (2 gal (7.6 ltr)) was first charged with hexane (1.12 lbs (0.51 kg)) and then with a butadiene/hexane blend (2.30 lbs (1.04 kg), 21.6 wt. % butadiene). The reactor was then heated to 135° F. (57.2° C.). After the temperature stabilized, polymerization was initiated with a solution of butyllithium (5.4 ml, 1.5 M in hexane). The temperature was maintained at 135° F. (57.2° C.) for the duration of the polymerization. After the reaction was completed (about 2 hours) the reactor was charged with a styrene/hexane blend (1.50 lbs (0.68 kg), 33 wt. % styrene). After an additional 2 hours, the reactor was charged with hexane (4 lbs (1.8 kg)) and divinyl benzene (50 ml). The reactor was maintained at 135° F. (57.2° C.) for another period of 2 hours and then the reactor was cooled to room temperature to yield a polymer particle solution. An aliquot was removed for GPC (gel permeation chromatography) analysis, which indicated that the polymer product had a number average molecular weight of 826,559 g/mol and a polydispersity of 1.10. The conversion of the reaction was about 100%.

Example 2

4.5 lbs (2 kg) of the polymer particle solution of Example 1 was mixed with a Ni catalyst solution (75 ml) and added to a 1 gal. (3.8 ltr) hydrogenation reactor. The reactor was then heated to 250° F. (121.1° C.). After the temperature stabilized, hydrogenation was initiated by charging the reactor with high-pressure $H_2$ gas (to about 115 psi (about 0.79 MPa). As the materials began to react with $H_2$ (after about 15 minutes), the pressure in the reactor started to drop. The reactor was recharged with $H_2$ up to about 115 psi (about 0.79 MPa). The procedure was repeated until the butadiene hydrogenation conversion reached 95% (as determined by $^1$H-NMR analysis). The reactor was cooled and the contents poured into isopropanol. The resulting precipitated polymer particles were dried in vacuum for 2 days at 73° F. (22.8° C.).

For transmission electron microscopy (TEM) analysis, a small amount (about 3 mg) of the dried polymer particles was added to hexane (about 40 ml) and the resulting mixture was subjected for a few hours to ultrasonic vibration (Model 2014B made by A&R Manufacturing). A drop of the resulting dispersion was coated on a graphed copper micro-screen and the hexane was evaporated. After evaporation, the screen was examined by TEM, which showed that the average particle size was about 20 nm and that the dispersity of the particle size was about 1.1.

Example 3

About 1 g of the nanoparticles prepared in Example 2 was dispersed into hexane (about 15 ml) under vigorous agitation, resulting in a paste-like material. A drop of this material was then coated onto a micro glass slide. The hexane was evaporated under vacuum (40 min) and subsequent heating (230° F. (110° C.), 5 min). Atomic force microscopy (AFM) showed that the surface of the coating had a nano-scaled roughness. The water contact angle of the surface was determined to be about 140 degrees.

Example 4

A polymerization reactor (2 gal. (7.6 ltr)) was first charged with an isoprene/hexane blend (3.38 lbs (1.53 ltr), 14.8 wt. % of isoprene). The mixture was then heated to 135° F. (57.2° C.). After the temperature stabilized, polymerization was initiated with butyllithium (5.4 ml, 1.5 M solution in hexane). The temperature was maintained at 135° F. (57.2° C.) for the duration of the polymerization. After the reaction was completed (about 2 hours), the reactor was charged with styrene/hexane blend (1.50 lbs (0.68 kg), 33 wt. % styrene). After additional reacting for 2 hours, the reactor was charged with hexane (4 lbs (1.8 kg)) and divinyl benzene (50 ml). The reactor was maintained at 135° F. (57.2° C.) for another period of 2 hours. The thus obtained product was poured into a 95:5 acetone/isopropanol blend (about 1 part by volume of the product per 1 part by volume of the acetone/isopropanol blend) and the thereby precipitated particles were dried in vacuum for 2 days at 73° F. (22.8° C.). GPC analysis of the dried product showed that the particles had an number average molecular weight of 1,078,089 with a polydispersity of the molecular weight of 1.14.

A mixture of the polymer particles in hexane was prepared (10 wt % particles) and a reactor was charged with 1 gallon of the mixture. The reactor was then charged with a Ni catalyst solution (50 ml) and the mixture was heated to 200° F. (93.3° C.). After the temperature stabilized, hydrogenation was initiated by charging the reactor with $H_2$ gas to about 100 psi (0.69 MPa). As the materials began to react with $H_2$ (after about 15 minutes), the pressure in the reactor started to drop. The reactor was recharged with $H_2$ up to about 100 psi (0.69 MPa) and the procedure was repeated until the isoprene hydrogenation conversion reached 92%, based on $^1$H-NMR analysis. GPC analysis show that the number average weight of the hydrogenated particle was about 1,174,420, and the polydispersity about 1.13. For TEM analysis, a small amount of the hydrogenated particles was taken from the reaction mixture and further diluted with toluene to about $10^{-4}$ wt. %. A drop of the diluted solution was coated on a graphed copper micro-screen and the solvent was evaporated. After evaporation, the screen was examined by TEM, which showed that the average particle size was about 35 nm, and the dispersity of the particle size was about 1.1.

Example 5

About 10 g of the hydrogenated nano-particles of Example 4 were mixed with hexane (about 200 ml). A drop of the thus obtained hexane mixture was put on a micro glass slide, followed by a drop of isopropanol to precipitate the nanoparticle. The solvents (hexane and isopropanol) were subsequently evaporated. The thus obtained coated glass surface was then pressed down (at a pressure of about 50 g/cm$^2$) against another micro glass slide at about 212° F. (about 100° C.) for about 5 minutes, resulting in a surface of stable nano-scaled roughness. The resulting surface had a water contact angle of about 155 degrees.

Example 6

A stoichiometric amount of an amine (4,4-methylene dianilene with an amine equivalent weight of 49.5 g/eq; purchased from Aldrich) was dissolved into liquid epoxy monomer (diglycidyl ether of bisphenol A with an epoxide equivalent weight of 174.3 g/eq.; purchased from Aldrich) at approximately 80° C. Complete dissolution took place within 30 minutes with vigorous stirring. Once the solution was clear, it was degassed under vacuum at 50° C. for 30 minutes. The degassed liquid mixture was then coated on an aluminum plate (2×6 inches (5.1 cm×15.2 cm)). The plate was then cured in an oven under nitrogen atmosphere at 120° C. for about 5 hours.

The partially reacted epoxy resin surface was coated on the surface with a hydrophobically treated fumed silica (Aerosil R8200, Degussa AG, particle size about 10 nm). The hydrophobic treatment consisted of converting the hydrophilic surface silanol groups on the silica to hydrophobic trimethyl silyl groups via treatment with hexamethyldisilazane. The plate was placed back in the oven and postured at 200° C. for an additional 12 hours.

The excess silica on the surface was carefully blown away using a blowgun. The resultant surface was examined by TEM, which showed the nano-sized silica aggregates partially impregnated inside the epoxy resin. The surface had a water contact angle of about 165 to 170 degrees.

Although the present invention has been described in terms of preferred embodiments, it is intended that the present invention encompass all modifications and variations that occur to those skilled in the art, upon consideration of the disclosure herein, those embodiments that are within the broadest proper interpretation of the claims and their requirements.

What is claimed is:

1. A coated substrate comprising: (1) a substrate having a first surface and (2) a top coat adjacent said first surface, wherein said top coat comprises at least two polymeric nanoparticles, wherein the nanoparticles contain crosslinking, and have a mean average diameter of no more than 500 nm and wherein each of the nanoparticles has a hydrophobic surface, whereby a water contact angle of the top coat comprises more than 120°.

2. The substrate of claim 1 wherein said contact angle comprises at least about 140°.

3. The substrate of claim 1 wherein a distance between at least two of said at least two nanoparticles comprises less than 1 micron.

4. The substrate of claim 1 wherein a ratio of the radius of two adjacent particles of said at least two nanoparticles comprises at least 100:1.

5. The substrate of claim 1 wherein said top coat comprises more than one layer of said nanoparticles.

6. The substrate of claim 1 wherein said average mean diameter of said nanoparticles comprises between at least about 5 nm to no more than about 250 nm.

7. The substrate of claim 1 wherein a size dispersity of said nanoparticles comprises between about 1 to about 3.

8. The substrate of claim 1 wherein said substrate comprises a transparent material.

9. The substrate of claim 1 wherein an orientation of said nanoparticles of said top coat comprises random.

10. The substrate of claim 1 wherein an orientation of said nanoparticles of said top coat comprises uniform.

11. The substrate of claim 1 wherein said mean average diameter of said nanoparticles comprises substantially random.

12. The substrate of claim 1 wherein said mean average diameter of said nanoparticles comprises substantially uniform.

13. The substrate of claim 1, wherein one of said at least two nanoparticles is organic.

14. The coated substrate of claim 1, wherein the polymeric nanoparticles are hydrogenated.

15. The coated substrate of claim 1, wherein the nanoparticles are surface modified with silyl groups.

16. An article comprising a nanoparticle surface layer wherein each nanoparticle contains crosslinking and has an exterior hydrophobic surface, wherein a water contact angle of said nanoparticle surface layer comprises at least 120°.

17. The article of claim 16, wherein said nanoparticle of said nanoparticle surface layer is organic.

18. The article of claim 16, wherein said nanoparticle surface layer is hydrophobic.

19. A coated substrate comprising: (1) a substrate having a first surface and (2) top coat adjacent said first surface, wherein said top coat comprises at least two nanoparticles, where the nanoparticles comprise surface modified silica, and have a mean average diameter of no more than 500 nm and wherein each of the nanoparticles has a hydrophobic surface, whereby a water contact angle of the top coat comprises more than 120°.

* * * * *